(12) United States Patent
Vaught et al.

(10) Patent No.: US 8,056,340 B2
(45) Date of Patent: Nov. 15, 2011

(54) EGR MIXER FOR HIGH-BOOST ENGINE SYSTEMS

(75) Inventors: August Thomas Vaught, Harper Woods, MI (US); Furqan Zafar Shaikh, Troy, MI (US); Lawrence Marshall, Saint Clair Shores, MI (US); Wayne Paul Woodside, Ypsilanti, MI (US); Karen Elizabeth Maceroni, Casco, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/858,268

(22) Filed: Aug. 17, 2010

(65) Prior Publication Data

US 2011/0162360 A1 Jul. 7, 2011

(51) Int. Cl.
*F02B 33/44* (2006.01)
*F02M 25/07* (2006.01)
*F02M 35/10* (2006.01)

(52) U.S. Cl. ............... 60/605.2; 60/611; 123/568.17

(58) Field of Classification Search ............ 60/605.2, 60/606, 611; 123/568.17; *F02M 25/07, F02M 35/10*
See application file for complete search history.

(56) References Cited

U.S. PATENT DOCUMENTS

| | | | | |
|---|---|---|---|---|
| 1,539,126 | A | 5/1925 | Link | 123/568.17 |
| 2,354,179 | A | 7/1944 | Blanc | 123/568.17 |
| 3,680,534 | A * | 8/1972 | Chavant | 123/568.17 |
| 4,215,550 | A * | 8/1980 | Dinger et al. | 60/605.2 |
| 5,771,868 | A * | 6/1998 | Khair | 60/605.2 |
| 6,003,316 | A * | 12/1999 | Baert et al. | 60/605.2 |
| 6,267,106 | B1 | 7/2001 | Feucht | 123/568.17 |
| 6,343,594 | B1 | 2/2002 | Koeslin et al. | 123/568.17 |
| 6,609,374 | B2 * | 8/2003 | Feucht et al. | 60/605.2 |
| 6,732,524 | B2 * | 5/2004 | Sponton | 60/605.2 |
| 7,013,879 | B2 * | 3/2006 | Brookshire et al. | 60/605.2 |
| 7,032,578 | B2 * | 4/2006 | Liu et al. | 123/568.17 |
| 7,140,357 | B2 | 11/2006 | Wei et al. | 123/568.17 |
| 7,322,193 | B2 * | 1/2008 | Bering et al. | 60/605.2 |

(Continued)

FOREIGN PATENT DOCUMENTS

DE 4429232 C1 * 9/1995

(Continued)

OTHER PUBLICATIONS

Rothrock, A. M., "The N.A.C.A. Apparatus for Studying the Formation and Combustion of Fuel Sprays and the Results From Preliminary Tests," National Advisory Committee for Aeronautics, Technical Note No. 389, Washington, Sep. 1931.

*Primary Examiner* — Thai Ba Trieu
(74) *Attorney, Agent, or Firm* — Julia Voutyras; Alleman Hall McCoy Russell & Tuttle LLP

(57) ABSTRACT

An EGR mixer comprises an upstream conduit section having a contracting flow area in a direction of air flow through the mixer, a downstream conduit section having an expanding flow area in the direction of air flow through the mixer, a slot formed in the downstream conduit section for admitting exhaust to the air flow, and an abrupt flow-expanding ridge disposed between the upstream and downstream conduit sections. With the EGR mixer configured in this manner, recirculated exhaust may be effectively homogenized into an intake air flow with reduced drag.

5 Claims, 3 Drawing Sheets

U.S. PATENT DOCUMENTS

| | | | |
|---|---|---|---|
| 7,353,811 B2 * | 4/2008 | Weisz | 123/568.17 |
| 7,487,633 B2 * | 2/2009 | Popik et al. | 60/289 |
| 7,552,722 B1 | 6/2009 | Shieh et al. | 123/568.17 |
| 7,568,340 B2 | 8/2009 | Marsal et al. | 60/605.2 |
| 7,624,575 B2 * | 12/2009 | Noelle et al. | 60/605.1 |
| 7,721,542 B2 * | 5/2010 | Chen | 60/605.2 |
| 7,798,134 B2 * | 9/2010 | Marsh et al. | 123/568.12 |
| 7,845,340 B2 * | 12/2010 | Fuchinoue et al. | 123/568.17 |
| 2003/0111065 A1 | 6/2003 | Blum | 123/568.17 |
| 2006/0042245 A1 * | 3/2006 | Wimmer et al. | 60/605.2 |
| 2007/0119433 A1 | 5/2007 | Popik et al. | 123/568.17 |
| 2008/0302091 A1 * | 12/2008 | Nardi et al. | 60/605.2 |
| 2009/0217915 A1 * | 9/2009 | Heald et al. | 123/568.17 |

FOREIGN PATENT DOCUMENTS

| | | |
|---|---|---|
| EP | 1152141 A1 * | 11/2001 |
| JP | 09133052 A * | 5/1997 |
| JP | 2006132373 A | 5/2005 |
| JP | 2005147010 A1 | 6/2005 |
| JP | 2007092592 A * | 4/2007 |
| KR | 2006058334 A * | 5/2006 |
| WO | WO 2006126963 A1 * | 11/2006 |

* cited by examiner

EGR MIXER FOR HIGH-BOOST ENGINE SYSTEMS

TECHNICAL FIELD

This application relates to the field of motor-vehicle engineering, and more particularly, to exhaust-gas recirculation in motor-vehicle engine systems.

BACKGROUND AND SUMMARY

A boosted engine may exhibit higher combustion and exhaust temperatures than a naturally aspirated engine of equivalent output power. Such higher temperatures may increase nitrogen-oxide (NOX) emissions and cause accelerated materials aging in the engine and associated exhaust system. Exhaust-gas recirculation (EGR) is one approach for combating these effects. EGR strategies reduce the oxygen content of the intake air charge by diluting it with exhaust. When the diluted air-exhaust mixture is used in place of ordinary air to support combustion in the engine, lower combustion and exhaust temperatures result. EGR also improves fuel economy in gasoline engines by reducing throttling losses and heat rejection.

In a boosted engine system equipped with a turbocharger compressor and a turbine, exhaust may be recirculated through a high pressure (HP) EGR loop or a low-pressure (LP) EGR loop. In the HP EGR loop, the exhaust is drawn from upstream of the turbine and is mixed with intake air downstream of the compressor. In the LP EGR loop, the exhaust is drawn from downstream of the turbine and is mixed with intake air upstream of the compressor. HP and LP EGR strategies achieve optimum efficacy in different regions of the engine load-speed map. For example, on boosted gasoline engines running stoichiometric air-to-fuel ratios, HP EGR is desirable at low loads, where intake vacuum provides ample flow potential; LP EGR is desirable at higher loads, where the LP EGR loop provides the greater flow potential. Various other trade-offs between the two strategies exist as well, both for gasoline and diesel engines. Such complementarity has motivated engine designers to consider EGR systems having both an HP EGR loop and an LP EGR loop.

To enable appropriate control of EGR dilution levels and protect combustion stability, the recirculated exhaust is homogenized with the intake air charge, for example via an EGR mixer. However, some EGR mixers suffer a trade-off between effective homogenization on the one hand and excessive air-flow restriction on the other. In other words, the flow elements that provide effective homogenization also cause drag in the intake air flow, which reduces overall efficiency. Conversely, EGR mixers that present minimal drag may not provide adequate homogenization at every mixing point and operating condition. The EGR mixer described in U.S. Pat. No. 7,568,340, for example, may present relatively little intake-air flow restriction. However, this mixer is configured for use in an LP EGR loop, where the long flow path and compressor action provide further homogenization, thereby reducing the performance demand on the mixer.

The inventors herein have recognized these issues and have devised a series of approaches to address them. Therefore, one embodiment of this disclosure provides an EGR mixer comprising an upstream conduit section having a contracting flow area in a direction of air flow through the mixer, a downstream conduit section having an expanding flow area in the direction of air flow through the mixer, a slot formed in the downstream conduit section for admitting exhaust to the air flow, and an abrupt flow-expanding ridge disposed between the upstream and downstream conduit sections. With an EGR mixer configured in this manner, recirculated exhaust may be effectively homogenized into an intake air flow with reduced drag. For example, the upstream and downstream conduit section may enable increase EGR flow to be drawn into the airflow, where the abrupt ridge operates to increase mixing of the EGR in the airflow.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

The subject matter of this disclosure is now described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree.

Figure 1:
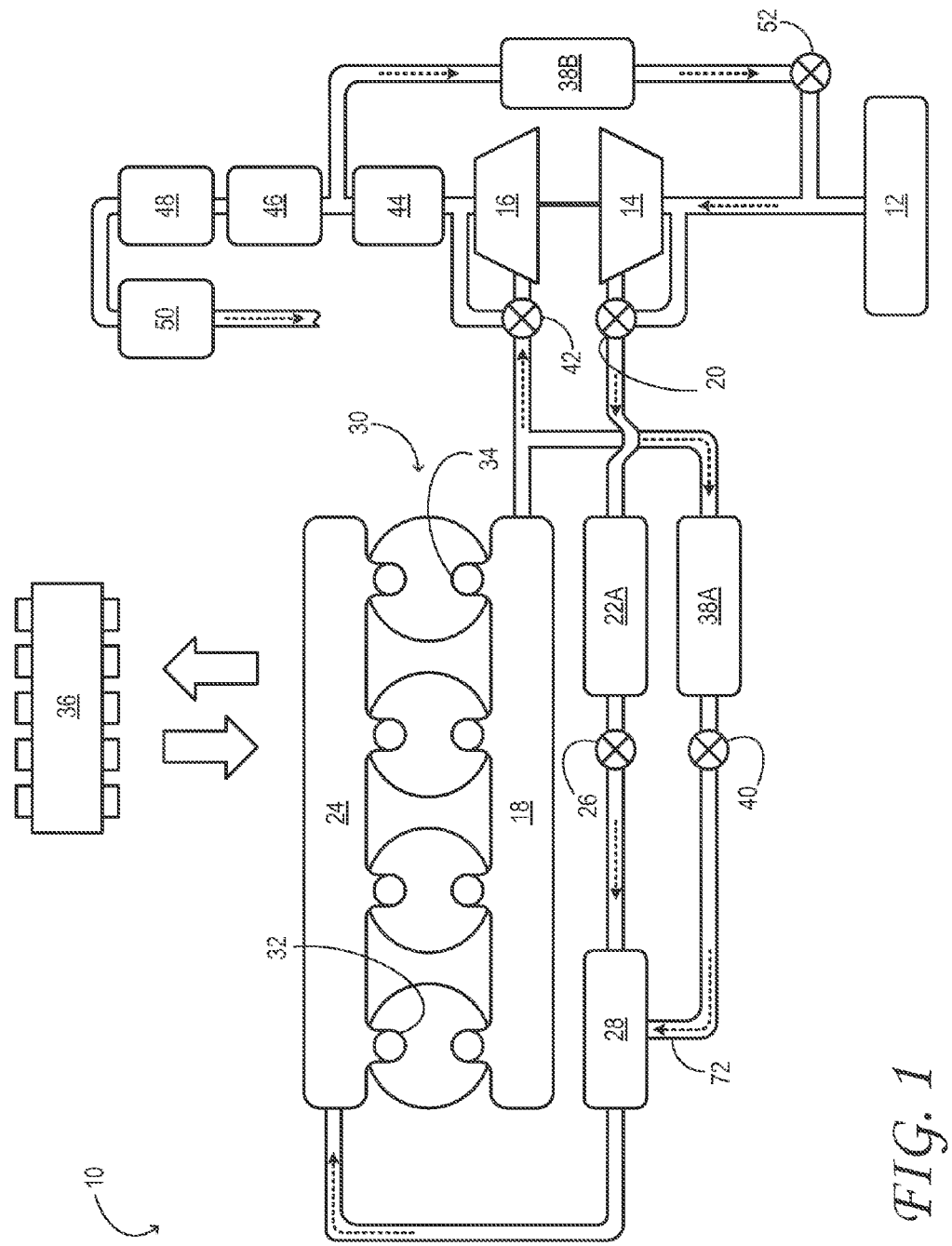
FIGS. 1 and 2 schematically show aspects of example engine systems in accordance with embodiments of this disclosure.

FIG. 1 schematically shows aspects of an example engine system 10 in one embodiment. In engine system 10, air cleaner 12 is coupled to the inlet of compressor 14. The air cleaner inducts fresh air from the ambient and supplies filtered, fresh air to the compressor. The compressor may be any suitable intake-air compressor—a motor or drive-shaft driven supercharger compressor, for example. In the embodiment illustrated in FIG. 1, however, the compressor is a turbocharger compressor mechanically coupled to turbine 16, the turbine driven by expanding engine exhaust from exhaust manifold 18. Blow-off valve 20 is coupled across the compressor from outlet to inlet. When the blow-off valve is opened, some or all of the compressed air charge downstream of the compressor may be discharged to a locus upstream of the compressor. This action may be taken to avert or relieve compressor surge, for instance. In one embodiment, compressor 14 and turbine 16 may be coupled within a twin scroll turbocharger. In another embodiment, the compressor and turbine may be coupled within a variable geometry turbocharger (VGT), where turbine geometry is actively varied as a function of engine speed. In still other embodiments, the blow-off valve of the compressor may be coupled between different loci of the engine system.

In engine system 10, the outlet of compressor 14 is coupled to charge-air cooler (CAC) 22A. In one embodiment, the CAC is a gas-to-liquid heat exchanger configured to cool the compressed air charge to temperatures suitable for admittance into intake manifold 24. To this end, the CAC may circulate liquid engine coolant through a closed loop that also contains engine cylinder jackets and a radiator. Excess heat from the compressed air charge may be absorbed into the engine coolant. In another embodiment, the CAC may be an air-to-air heat exchanger. Through throttle valve 26 and EGR mixer 28 (vide infra), the outlet of the CAC is coupled to the intake manifold.

Intake manifold 24 and exhaust manifold 18 are coupled to a series of combustion chambers 30 through a series of intake valves 32 and exhaust valves 34, respectively. In one embodiment, each of the intake and exhaust valves may be electronically actuated. In another embodiment, each of the intake and exhaust valves may be cam actuated. Whether electronically actuated or cam actuated, the timing of intake and exhaust valve opening and closure may be adjusted as needed for desirable combustion and emissions-control performance. In particular, valve timing may be adjusted so that combustion is initiated when a substantial amount of exhaust from a previous combustion is still present in one or more of the combustion chambers. Such adjusted valve timing may enable an 'internal EGR' mode useful for reducing peak combustion temperatures under selected operating conditions. In some embodiments, adjusted valve timing may be used in addition to the 'external EGR' modes described hereinafter.

FIG. 1 shows electronic control system 36. In embodiments where an intake or exhaust valve of engine system 10 is configured to open and close according to an adjustable timing, the adjustable timing may be controlled by the electronic control system to regulate an amount of exhaust present in a combustion chamber at the time of ignition. To assess operating conditions in connection with various control functions of the engine system, the electronic control system may be operatively coupled to a plurality of sensors arranged in the engine system—flow sensors, temperature sensors, pedal-position sensors, pressure sensors, etc.

In combustion chambers 30 combustion may be initiated via spark ignition and/or compression ignition in any variant. Further, the combustion chambers may be supplied any of a variety of fuels: gasoline, alcohols, diesel, biodiesel, compressed natural gas, etc. Fuel may be supplied to the combustion chambers via direct injection, port injection, throttle-body injection, or any combination thereof.

Continuing in FIG. 1, HP EGR cooler 38A is coupled downstream of exhaust manifold 18 and upstream of turbine 16. The HP EGR cooler is a gas-to-liquid heat exchanger configured to cool the exhaust to temperatures suitable for mixing into the compressed air charge. To this end, the HP EGR cooler may circulate liquid coolant through a closed loop that also includes a radiator. Excess heat from the exhaust may be absorbed into the liquid coolant. From the HP EGR cooler, HP exhaust flows through portioning valve 40 to EGR mixer 28. More generally, a portioning valve for controlling the HP EGR flow rate may be located either upstream or downstream of the HP EGR cooler. Further, a cooler by-pass line and valve may be included to provide a parallel HP EGR loop that does not exchange heat with the coolant. The by-pass line may be used to flow substantially uncooled HP exhaust to the intake manifold. As further described hereinafter, EGR mixer 28 mixes the metered exhaust into the intake air charge. From the outlet of the EGR mixer, the diluted air charge flows to intake manifold 24.

Engine system 10 includes waste gate 42, coupled across turbine 16 from inlet to outlet. When reduced turbine torque is desired, some exhaust from exhaust manifold 18 may be directed through the waste gate, by-passing the turbine. The combined flow from the turbine and the waste gate then flows through exhaust-aftertreatment devices 44, 46, and 48. The nature, number, and arrangement of the exhaust-aftertreatment devices may differ in the different embodiments of this disclosure. In general, the exhaust-aftertreatment devices may include at least one catalyst configured to catalytically treat the exhaust flow, and thereby reduce an amount of one or more substances in the exhaust flow. For example, one catalyst may be configured to trap NOX from the exhaust flow when the exhaust flow is lean, and to reduce the trapped NOX when the exhaust flow is rich. In other examples, a catalyst may be configured to disproportionate NOX or to selectively reduce NOX with the aid of a reducing agent. In other examples, a catalyst may be configured to oxidize residual hydrocarbons and/or carbon monoxide in the exhaust flow. Further, at least one of the exhaust-aftertreatment devices may comprise a light-off catalyst and/or a three-way catalyst. Different catalysts having any such functionality may be arranged in wash coats or elsewhere in the exhaust-aftertreatment devices, either separately or together. The exhaust-aftertreatment devices may also include a regenerable soot filter configured to trap and oxidize soot particles in the exhaust flow.

Continuing in FIG. 1, silencer 50 is coupled downstream of the exhaust-aftertreatment devices. All or part of the treated exhaust flow from the exhaust aftertreatment devices may be released into the ambient via the silencer. Depending on operating conditions, however, some treated exhaust may be drawn instead through LP EGR cooler 38B. The LP EGR cooler is a gas-to-liquid heat exchanger configured to cool the exhaust to temperatures suitable for mixing into the intake air flow. To this end, the LP EGR cooler may circulate liquid coolant through a closed loop that also includes a radiator. Excess heat from the exhaust may be absorbed into the liquid coolant. In another embodiment, the LP EGR cooler may be a gas-to-air heat exchanger. Coupled downstream of the LP EGR cooler and upstream of compressor 14, portioning valve 52 controls the flow rate of LP exhaust through the LP EGR loop of the engine system. From portioning valve 52, LP exhaust flows to the inlet of the compressor.

One or more of blow-off valve 20, throttle valve 26, portioning valves 40 and 52, and waste gate 42 may be electronically controlled, configured to close and open at the command of electronic control system 36. Further, one or more of these valves may be continuously adjustable. The electronic control system may be operatively coupled to any or all electronically controlled valves and configured to command their opening, closure, and/or adjustment, as needed to enact any of the control functions described herein.

By appropriately controlling portioning valves 40 and 52, and by adjusting the exhaust and intake valve timing (vide supra), electronic control system 36 may enable engine system 10 to deliver intake air to combustion chambers 30 under varying operating conditions. These include conditions where EGR is omitted from the intake air or is provided internal to each combustion chamber, conditions where EGR is drawn from a take-off point upstream of turbine 16 and delivered to a mixing point downstream of compressor 14 (HP EGR), and conditions where EGR is drawn from a take-off point downstream of the turbine and delivered to a mixing point upstream of the compressor (LP EGR).

Enabling multiple EGR modes in an engine system provides several advantages. For instance, cooled LP EGR may be used for low-speed operation. Here, EGR flow through the compressor moves the operating point away from the surge line. Turbine power is preserved, as the EGR is drawn downstream of the turbine. On the other hand, cooled HP EGR may be used for mid-to-high speed operation. Under such conditions, where waste gate 34 may be at least partly open, drawing EGR from upstream of the turbine will not degrade turbocharger performance, and, as since no EGR is drawn through the compressor, the operating margin between choke and over-speed lines may be preserved.

It will be understood that no aspect of FIG. 1 is intended to be limiting. In particular, take-off and mixing points for HP and LP EGR may differ in the different embodiments of this disclosure. For example, while FIG. 1 shows LP EGR being drawn from downstream of exhaust-aftertreatment device 44, the LP EGR may in other embodiments be drawn from downstream of exhaust-aftertreatment device 48, or upstream of exhaust-aftertreatment device 44. Other embodiments may lack an LP EGR cooler or LP EGR loop. Still other embodiments may lack an HP EGR loop. In yet another embodiment, an EGR mixer may be coupled in the LP EGR loop.

Figure 2:
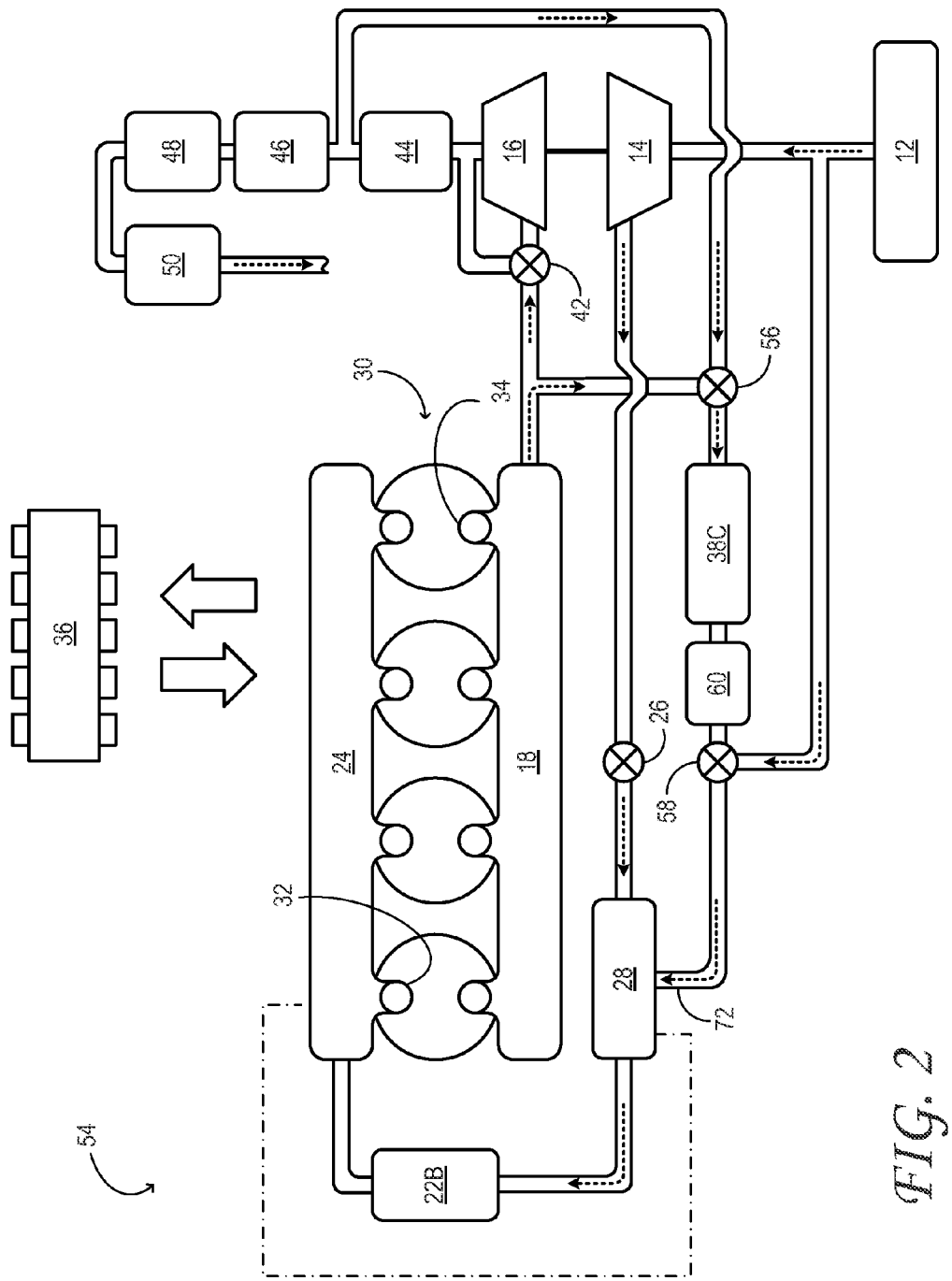

FIG. 2 schematically shows aspects of another example engine system 54 in one embodiment. Like engine system 10, engine system 54 includes an HP EGR loop and an LP EGR loop. In engine system 54, however, some components of the HP and LP EGR loops are shared in common.

Engine system 54 includes high-temperature (HT) EGR cooler 38C. The HT EGR cooler may be any suitable heat exchanger configured to cool an HP or LP exhaust flow for desired combustion and emissions-control performance. Shared between the HP and LP EGR loops, the HT EGR cooler may be sized to provide appropriate cooling for the LP EGR loop. EGR-selecting valve 56 is coupled upstream of the HT EGR cooler. In one embodiment, the EGR-selecting valve may be a two-state valve, where in a first state, valve permits post-turbine exhaust to flow to the HT EGR cooler but blocks pre-turbine exhaust from flowing to the HT EGR cooler; in a second state, the valve blocks post-turbine exhaust from flowing to the HT EGR cooler but allows pre-turbine exhaust to flow to the HT EGR cooler. In one embodiment, the EGR-selecting valve may have a dual-bore butterfly structure.

From HT EGR cooler 38C, the cooled exhaust flow is admitted to EGR-directing valve 58. The EGR-directing valve may enable both flow metering and flow selection, where the cooled exhaust flow is metered and routed to either an HP EGR mixing point or an LP EGR mixing point. In the embodiment shown in FIG. 2, the EGR-directing valve meters and routes the cooled exhaust flow to CAC/EGR cooler 22B (an HP mixing point) or back to the inlet of compressor 14 (an LP mixing point). In one embodiment, the EGR-directing valve may be a sliding-piston or linear-spool type valve actuated by an electric motor. Here, a substantially cylindrical piston may slide within a cylindrical valve body having appropriate seals. Positional feedback in the valve or in an associated valve actuator may enable closed-loop flow control in some embodiments.

CAC/EGR cooler 22B may be any suitable heat exchanger configured to cool the compressed air charge to temperatures suitable for admission to intake manifold 24. In particular, the CAC/EGR cooler may effect a second stage of cooling for the HP EGR loop. The CAC/EGR cooler may be configured to cool the exhaust to lower temperatures than HT EGR cooler 48—by circulating a low-temperature coolant, for example—as condensation of water vapor in the HP EGR loop presents no risk to the compressor system. From the CAC/EGR cooler, the cooled, diluted air charge flows to the intake manifold.

In the example configuration of FIG. 2, HP and LP EGR loops share a common flow path between EGR-selecting valve 56 and EGR-directing valve 58. Therefore, a common flow sensor coupled within this flow loop can provide EGR flow measurement for both loops. Accordingly, engine system 54 includes flow sensor 60 coupled downstream of HT EGR cooler 38C and upstream of EGR-directing valve 58. The flow sensor may comprise a hot wire anemometer, a delta pressure orifice, or a venturi, for example, operatively coupled to electronic control system 36. Certain advantages accrue from the sharing—i.e., double use—of at least some components between HP and LP EGR loops. In engine system 54, shared EGR components include HT EGR cooler 38C, EGR flow sensor 60, EGR selection and control valves, and the section of conduit running therebetween. By configuring these components to be shared instead of redundant, a significant savings in the cost and weight of the engine system may be realized. Further, the shared configuration may result in less crowding in the engine system, as compared to configurations in which all EGR components are provided redundantly. Moreover, closed-loop control of EGR dosing may be simplified when only a single sensor need be interrogated to measure the EGR flow rate for both HP and LP EGR loops.

To illustrate yet another advantage, it will be noted that engine system 54 and electronic control system 36 may be further configured for additional operating modes, where EGR is provided via a combination or admixture of the modes described herein. For example, by appropriate positioning of EGR-directing valve 58 and EGR-selecting valve 56, recirculated exhaust may be routed from an HP take-off point to an LP mixing point. This strategy may be desirable under some operating conditions—to avoid surge in first compressor 14 or to enhance EGR flow, for example.

Figure 3:
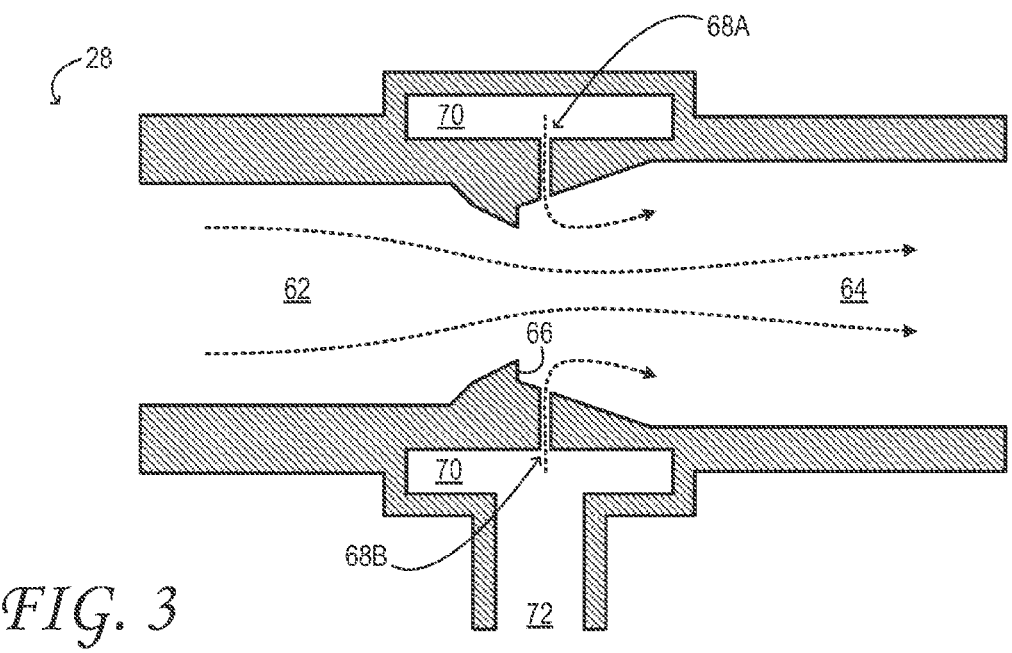
FIGS. 3 and 4 show aspects of example EGR mixers in accordance with embodiments of this disclosure.
Figure 4:
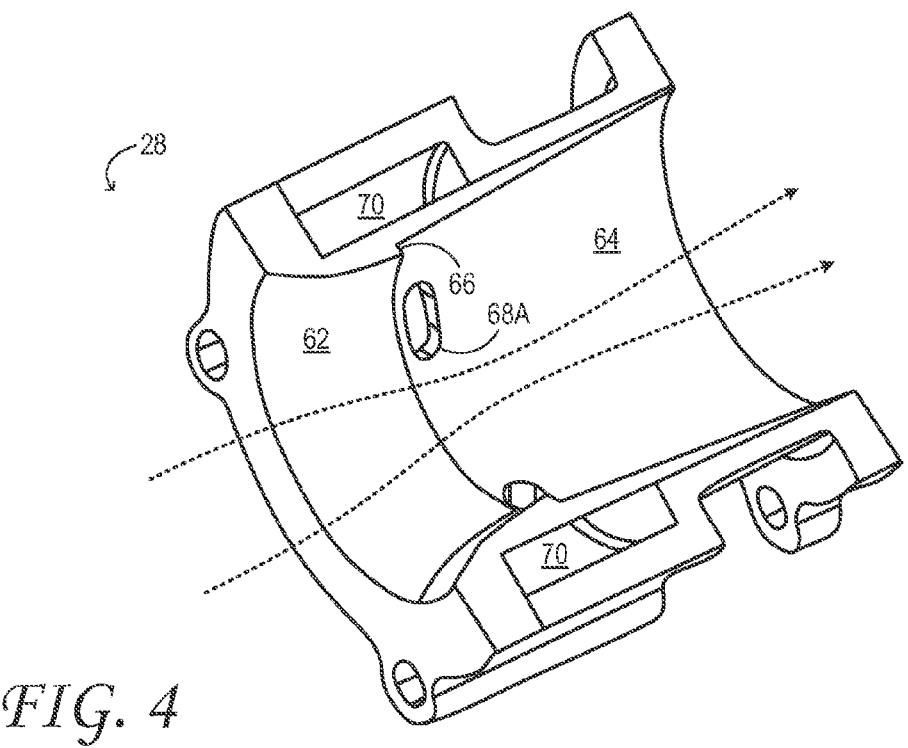

FIG. 3 shows, in cross section, aspects of EGR mixer 28 in one embodiment. This drawing is somewhat schematic and not necessarily rendered to scale. FIG. 4 shows a cut-away, perspective view of the EGR mixer embodiment. This drawing is based on a model of the EGR mixer and is rendered to scale. EGR mixer 28 includes an upstream conduit section 62 having a contracting flow area in a direction of air flow through the mixer, and a downstream conduit section 64 having an expanding flow area in the direction of air flow through the mixer. Together, the upstream and downstream conduit sections define a conduit interior.

As shown in FIG. 3, the conduit interior presents a varying cross-sectional flow area normal to the direction of air flow through the mixer. In the illustrated embodiment, the flow area through the mixer contracts gradually from the upstream end of the upstream conduit to the abrupt flow-expanding ridge. For example, the flow area in the upstream conduit section may be lower by 55 to 65% at the abrupt flow-expanding ridge than at the upstream end of the upstream conduit section. It will be understood, however, that the numerical values and ranges cited herein are examples only, and that other values and ranges are contemplated as well. Further, the flow area through the mixer may expand gradually from the abrupt flow-expanding ridge to the downstream end of the downstream conduit section. For example, the flow area in the downstream conduit section may be greater by 50 to 60% at the downstream end of the downstream conduit section than at the abrupt flow-expanding ridge. Thus, at least one flow area of the downstream conduit section may be larger than a flow area of the upstream conduit section. At abrupt flow-expanding ridge 66, the flow area of the downstream conduit section expands to the flow area of the upstream conduit section. In one embodiment, the flow area may expand by 1 to 10% at the ridge. In one embodiment, the abrupt flow-expanding ridge may define a plane, where the flow area through the mixer is smallest. Configured in this manner, the conduit interior comprises a venturi, which accelerates the intake air flow under non-boosted conditions. For admitting exhaust to the air flow, slots 68A and 68B are formed in the downstream conduit section. The available EGR rate depends on the factors such as the slot shape and dimensions as well as the overall mixer dimensions. These, in turn, are dependent on the dimensions of the engine in which the EGR mixer is installed. Embodiments fully consistent with this disclosure may be used with small (e.g., 1.4 liter) engines, large (e.g., 6.7+ liter engines), or in between, with the various rates, dimensions, and numbers of slots adjusted appropriately for engine size. Nevertheless, the inventors herein have recognized that particular relative dimension of the mixer may provide unexpected benefits in terms of flow restriction, mixing uniformity, etc. FIG. 3 shows two slots, but in other embodiments, the EGR mixer may include only one slot, or more than two. Further, the slots may be arranged circumferentially around the upstream or downstream conduit sections. As better seen from FIG. 4, the slots may be oblong in shape to promote a cascade-like (as opposed to jet-like) entry of exhaust into the conduit interior.

EGR mixer 28 also includes an exhaust chamber 70 arranged circumferentially around upstream conduit section 62 and downstream conduit section 64. Slots 68A and 68B couple the exhaust chamber to the conduit interior. As shown in FIG. 3, the exhaust chamber communicates with exhaust inlet 72, through which exhaust from an EGR passage is received.

Continuing in FIGS. 3 and 4, an abrupt flow-expanding ridge 66 is disposed between the upstream and downstream conduit sections. The abrupt flow-expanding ridge promotes turbulent mixing of the exhaust into the air flow for effective homogenization, especially under light-load conditions.

EGR mixer 28 combines very low intake-air restriction with very effective homogenization. It is suitable, therefore, for the HP EGR loop of a high pressure-ratio turbocharged engine—e.g. an engine in which the compressor supports a pressure ratio of 3 or greater. Further, the EGR mixer is designed for minimal EGR fouling over high-mileage accumulation in a motor vehicle. In one embodiment, the EGR mixer may be integrated directly into the intake manifold of the engine. In another embodiment, the EGR mixer may be arranged in a housing external to the intake manifold and coupled to the intake manifold. As shown in FIG. 4, the EGR mixer may be coupled to a four-bolt throttle body for ease of service.

Although the disclosed EGR mixer (28, 28') is well-suited for use in an HP EGR loop, it may also be used in an LP EGR loop. Thus, the upstream conduit section (62) of the EGR mixer (28') may be coupled to an air cleaner (12), the downstream conduit section (64) may be coupled upstream of the compressor (14) in an intake air-flow direction, and the exhaust chamber (70) may be coupled downstream of the turbine (16) in the exhaust-flow direction. In engine systems having both an HP and an LP EGR loop (e.g., FIG. 1) or a hybrid HP/LP EGR configuration (e.g., FIG. 2), two suitably sized EGR mixers (28, 28') may be included.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A motor-vehicle engine system comprising:
an engine having an intake manifold and an exhaust manifold;
a turbine configured to receive exhaust from the exhaust manifold;
a compressor mechanically coupled to the turbine and configured to supply air to the intake manifold; and
an EGR mixer comprising an upstream conduit section having a contracting flow area in a direction of air flow through the mixer, a downstream conduit section having an expanding flow area in the direction of air flow through the mixer, a plurality of circumferentially arranged slots formed in the downstream conduit section for admitting exhaust to the air flow, an abrupt flow-expanding ridge disposed between the upstream and downstream conduit sections downstream of the slots, and an exhaust chamber arranged circumferentially around the upstream and/or downstream conduit sections fluidically coupled between an EGR passage and the slots,
wherein the upstream conduit section is coupled to an air cleaner, wherein the downstream conduit section is coupled upstream of the compressor in an intake air-flow direction and wherein the exhaust chamber is coupled downstream of the turbine in an exhaust-flow direction; and
wherein the EGR mixer is externally coupled to the intake manifold.

2. The system of claim 1, wherein the compressor is configured to support a high pressure ratio.

3. A motor-vehicle engine system comprising:
an engine having an intake manifold and an exhaust manifold;
a turbine configured to receive exhaust from the exhaust manifold;
a compressor mechanically coupled to the turbine and configured to supply air to the intake manifold; and
a first and second EGR mixer comprising an upstream conduit section having a contracting flow area in a direction of air flow through the mixer, a downstream conduit section having an expanding flow area in the direction of air flow through the mixer a plurality of circumferentially arranged slots formed in the downstream conduit section for admitting exhaust to the air flow, an abrupt flow-expanding ridge disposed between the upstream and downstream conduit sections downstream of the slots, and an exhaust chamber arranged circumferentially around the upstream and/or downstream conduit sections fluidically coupled between an EGR passage and the slots;
wherein the upstream conduit section of the first EGR mixer is coupled downstream of the compressor in an intake air-flow direction, wherein the downstream conduit section of the first EGR mixer is coupled to the intake manifold, and wherein the exhaust chamber of the first EGR mixer is coupled upstream of the turbine in an exhaust-flow direction; and
wherein the upstream conduit section of the second EGR mixer is coupled to an air cleaner, wherein the downstream conduit section of the second EGR mixer is coupled upstream of the compressor in an intake air-flow direction, and wherein the exhaust chamber of the second EGR mixer is coupled downstream of the turbine in an exhaust-flow direction; and wherein the second EGR mixer is externally coupled to the intake manifold.

4. A motor-vehicle engine system comprising:
an engine having an intake manifold and an exhaust manifold;
a turbine configured to receive exhaust from the exhaust manifold;
a compressor mechanically coupled to the turbine and configured to supply air to the intake manifold;
an EGR mixer comprising an upstream conduit section having a contracting flow area in a direction of air flow through the mixer, a downstream conduit section having expanding flow area in the direction of air flow through the mixer, a plurality circumferentially arranged slots formed in the downstream conduit section for admitting exhaust to the air flow, an abrupt flow-expanding ridge disposed between the upstream and downstream conduit sections downstream of the slots, and an exhaust chamber arranged circumferentially around the upstream and/or downstream conduit sections fluidically coupled between an EGR passage and the slots; and an EGR-directing valve that, in a first state, admits exhaust from upstream of turbine to the exhaust chamber, and, in a second state, blocks the exhaust from upstream of the turbine from entering the exhaust chamber and admits exhaust from downstream the turbine to an inlet of the compressor.

5. The system of claim 4, wherein the EGR-directing valve is coupled downstream of a high-temperature EGR cooler, which is coupled downstream of EGR-selecting valve in an EGR-flow direction through the EGR passage, and whet the high-temperature EGR cooler, in the first state, cools the exhaust from upstream the turbine, and, in the second state, cools the exhaust from downstream of the turbine.

* * * * *